US012593272B2

(12) United States Patent
Roy et al.

(10) Patent No.: US 12,593,272 B2
(45) Date of Patent: Mar. 31, 2026

(54) METHOD AND USER EQUIPMENT (UE) FOR SELECTING ACCESS NETWORK FOR ROUTING DATA OF THE UE

(71) Applicant: Samsung Electronics Co., Ltd., Suwon-si (KR)

(72) Inventors: Koustav Roy, Bangalore (IN); Arijit Sen, Bangalore (IN); Jagadeesh Gandikota, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 458 days.

(21) Appl. No.: 18/302,409

(22) Filed: Apr. 18, 2023

(65) Prior Publication Data

US 2023/0328639 A1    Oct. 12, 2023

Related U.S. Application Data

(63) Continuation of application No. PCT/KR2023/004861, filed on Apr. 11, 2023.

(30) Foreign Application Priority Data

Apr. 12, 2022    (IN) .......................... IN202241021921

(51) Int. Cl.
*H04W 48/18* (2009.01)
*H04W 40/02* (2009.01)
(52) U.S. Cl.
CPC ........... *H04W 48/18* (2013.01); *H04W 40/02* (2013.01)
(58) Field of Classification Search
CPC .............................. H04W 48/18; H04W 40/02
See application file for complete search history.

(56) References Cited

U.S. PATENT DOCUMENTS

2014/0295913 A1    10/2014    Gupta
2018/0270877 A1    9/2018    Lee et al.
(Continued)

FOREIGN PATENT DOCUMENTS

KR    10-2020-0029462 A    3/2020
KR    10-2021-0099386 A    8/2021
(Continued)

OTHER PUBLICATIONS

CATT, MO-LR Procedure when UE is served by the Different PLMNs via 3GPP Access and Non-3GPP Access, S2-1903599, SA WG2 Meeting #132, XP051719746, Xi'an, China, Apr. 2, 2019.
European Search Report dated Apr. 24, 2025, issued in European Application No. 23788569.4.
Indian Office Action dated Feb. 6, 2024, issued in Indian Application No. 202241021921.
(Continued)

*Primary Examiner* — Wayne H Cai
(74) *Attorney, Agent, or Firm* — Jefferson IP Law, LLP

(57) ABSTRACT
A method of selecting access network for routing data of user equipment (UE) is provided. The method includes receiving trigger indicating a requirement of one or more network services. Further, the method includes determining that a UE is registered on a Third Generation Partnership Project (3GPP) access network and a non-3GPP access network simultaneously. The method includes identifying availability of one or more network services in the 3GPP access network and the non-3GPP access network. Thereafter, the method includes selecting one of, the 3GPP access network and the non-3GPP network, based on availability of one or more network services in one of, the 3GPP access network and the non-3GPP access network, or selecting one of, the 3GPP access network and the non-3GPP network based on one or more network parameters, when one or more network services are available in the 3GPP access network and the non-3GPP access network.

15 Claims, 15 Drawing Sheets

(56) References Cited

U.S. PATENT DOCUMENTS

| | | | |
|---|---|---|---|
| 2020/0120585 A1 | 4/2020 | Kumar et al. | |
| 2021/0250409 A1 | 8/2021 | Huang-Fu | |
| 2021/0392615 A1 | 12/2021 | Wong et al. | |
| 2022/0217569 A1* | 7/2022 | Yu | H04W 28/24 |
| 2022/0272620 A1 | 8/2022 | Ninglekhu et al. | |
| 2022/0386100 A1 | 12/2022 | Lee et al. | |
| 2023/0319634 A1 | 10/2023 | Youn et al. | |
| 2024/0244502 A1 | 7/2024 | Kumar et al. | |
| 2024/0340782 A1* | 10/2024 | Atarius | H04W 48/18 |
| 2025/0119859 A1* | 4/2025 | Velev | H04W 60/005 |

FOREIGN PATENT DOCUMENTS

| | | | |
|---|---|---|---|
| WO | 2020/252281 A1 | 12/2020 | |
| WO | 2021/049782 A1 | 3/2021 | |
| WO | 2021/069056 A1 | 4/2021 | |
| WO | 2022/034015 A1 | 2/2022 | |
| WO | 2022/050659 A1 | 3/2022 | |
| WO | 2022/245053 A1 | 11/2022 | |

OTHER PUBLICATIONS

3GPP TS 24.501 V18.2.1 3rd Generation Partnership Project; Technical Specification Group Core Network and Terminals; Non-Access-Stratum (NAS) protocol for 5G System (5GS); Stage 3; (Release 18), Mar. 2023.

3GPP TS 23.502 V18.1.1 3rd Generation Partnership Project; Technical Specification Group Services and System Aspects; Procedures for the 5G System (5GS); Stage 2 (Release 18), Apr. 2023.

3GPP TS 23.501 V18.1.0 3rd Generation Partnership Project; Technical Specification Group Services and System Aspects; System architecture for the 5G System (5GS); Stage 2 (Release 18), Mar. 2023.

Orange, Function Description of Access Network Selection, S2-072936, 3GPP TSG SA WG2 Meeting #58, Orlando, FL, USA, pp. 1-2, Jul. 2, 2007.

Motorola Mobility et al., Introduction of ATSSS Support, S2-1902332, 3GPP TSG SA WG2 Meeting #131, Santa Cruz, Tenerife, Spain, pp. 7-14; and figure 4.2.x-3, Mar. 1, 2019.

International Search Report dated Jul. 12, 2023, issued in International Application No. PCT/KR2023/004861.

* cited by examiner

FIG. 3

300

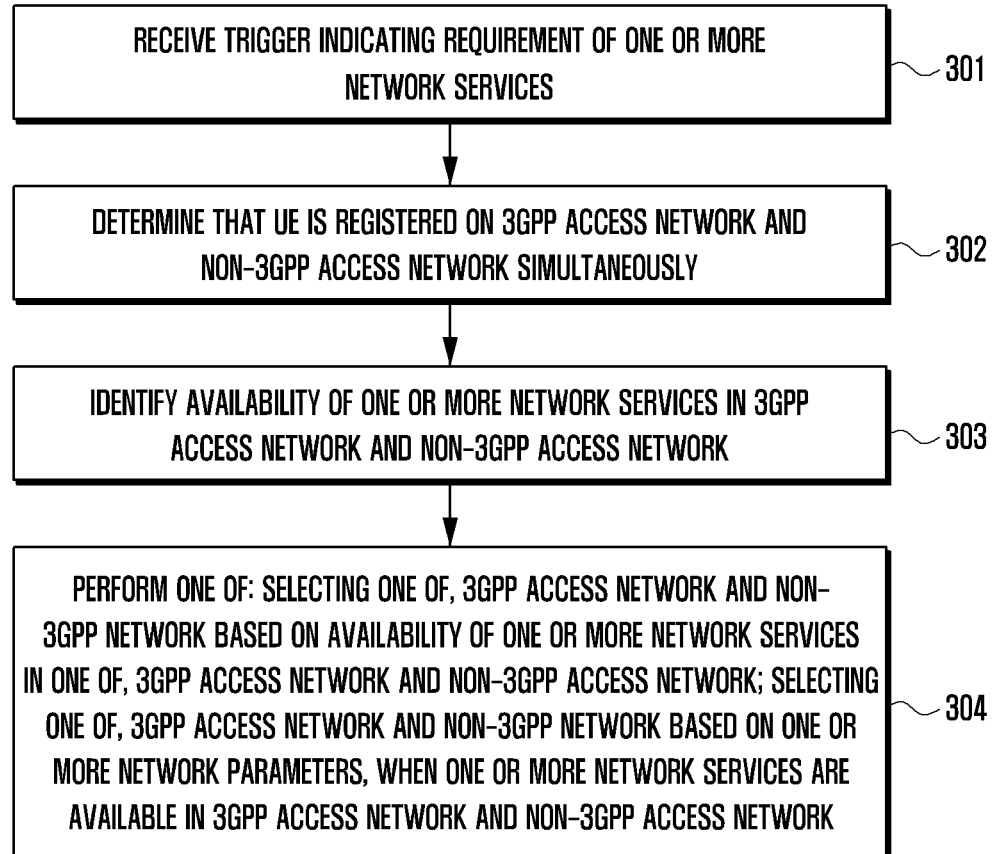

| RECEIVE TRIGGER INDICATING REQUIREMENT OF ONE OR MORE NETWORK SERVICES | ~ 301 |

| DETERMINE THAT UE IS REGISTERED ON 3GPP ACCESS NETWORK AND NON-3GPP ACCESS NETWORK SIMULTANEOUSLY | ~ 302 |

| IDENTIFY AVAILABILITY OF ONE OR MORE NETWORK SERVICES IN 3GPP ACCESS NETWORK AND NON-3GPP ACCESS NETWORK | ~ 303 |

| PERFORM ONE OF: SELECTING ONE OF, 3GPP ACCESS NETWORK AND NON-3GPP NETWORK BASED ON AVAILABILITY OF ONE OR MORE NETWORK SERVICES IN ONE OF, 3GPP ACCESS NETWORK AND NON-3GPP ACCESS NETWORK; SELECTING ONE OF, 3GPP ACCESS NETWORK AND NON-3GPP NETWORK BASED ON ONE OR MORE NETWORK PARAMETERS, WHEN ONE OR MORE NETWORK SERVICES ARE AVAILABLE IN 3GPP ACCESS NETWORK AND NON-3GPP ACCESS NETWORK | ~ 304 |

METHOD AND USER EQUIPMENT (UE) FOR SELECTING ACCESS NETWORK FOR ROUTING DATA OF THE UE

CROSS-REFERENCE TO RELATED APPLICATION(S)

This application is a continuation application, claiming priority under § 365(c), of an International application No. PCT/KR2023/004861, filed on Apr. 11, 2023, which is based on and claims the benefit of an Indian patent application number 202241021921, filed on Apr. 12, 2022, in the Indian Intellectual Property Office, the disclosure of each of which is incorporated by reference herein in its entirety.

TECHNICAL FIELD

The disclosure relates to the field of communication networks. More particularly, the disclosure relates to a method and a User Equipment (UE) for selecting access network for routing data of the UE.

BACKGROUND

An access network is a technology that connect User Equipments (UE) to core network. Examples of the access networks include Wi-Fi, Global System for Mobile communication (GSM), universal mobile telecommunications system (UMTS) Terrestrial Radio Access Network (UTRAN), Worldwide Interoperability for Microwave Access (WiMAX), and the like. The access networks that are specified in Third (3$^{rd}$) Generation Partnership Project (3GPP) are termed as 3GPPP access networks. Examples include UTRAN, GSM, and the like. The access networks that are not specified in the 3GPP are termed as non-3GPP access networks. In the conventional systems, data (also termed as application traffic) of the UE is always routed to the non-3GPP access network. For example, when the UE is connected to the Wi-Fi and the 3GPP access network, the UE will always use internet traffic and any voice/video calls (if supported) via the Wi-Fi only. There is a network handover from the 3GPP access network to the non-3GPP access network. In some cases, the data of the UE is always routed to the 3GPP access network based on preferences of network operator. With evolution of wireless communication networks, new technologies such as Local Area Data Network (LADN), network slicing, reflective Quality of Service (QoS), support of many other QoS Class Identifiers (QCIs), Voice over New Radio (VoNR) support, and the like, are emerging. Hence, always routing the data of the UE to the non-3GPP access network or fixedly to the 3GPP access network may not be the optimum solution.

The 3GPP has specified a set of rules i.e., UE Route Selection Policy (URSP) rules. The URSP rules determine application traffic route for routing the data of the UE. The access network belongs to a Public Land Mobile Network (PLMN). Each PLMN has associated URSP rules. Same URSP rules are applied when the 3GPP access network and the non-3GPP access network belongs to same PLMN. However, the conventional systems do not define the URSP rules to be applied or priority of the URSP rules when the 3GPP access network and the non-GPPP access network belong to different PLMNs. For instance, the 3GPP access network may belong to PLMN-A and the non-3GPP access network may belong to PLMN-B. URSP rules of the PLMN-A (say URSP-A) and URSP rules of the PLMN-B (say URSP-B) will be different, and each rule of URSP-A and URSP-B will include different priority defined. Conventional systems do not define the URSP rules to be applied or priority of the URSP rules when the 3GPP access network and the non-GPPP access network belong to different PLMNs.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide to a method and a User Equipment (UE) for selecting access network for routing data of the UE.

Additional aspects will be set forth in part in the description which follows and, in part, will be apparent from the description, or may be learned by practice of the presented embodiments.

In accordance with an aspect of the disclosure, a method of selecting an access network for routing data of a User Equipment (UE) in a wireless communication network is provided. The method includes receiving a trigger indicating a requirement of one or more network services. Furthermore, the method comprises determining that the UE is registered on a Third (3$^{rd}$) Generation Partnership Project (3GPP) access network and a non-3GPP access network simultaneously. Furthermore, the method comprises identifying an availability of the one or more network services in the 3GPP access network and the non-3GPP access network. Thereafter, the method comprises performing one of, (i) selecting one of, the 3GPP access network and the non-3GPP network for routing data of the UE, based on the availability of the one or more network services in one of, the 3GPP access network and the non-3GPP access network, and (ii) selecting one of, the 3GPP access network and the non-3GPP network for routing data of the UE based on one or more network parameters, when the one or more network services are available in the 3GPP access network and the non-3GPP access network.

In accordance with another aspect of the disclosure, a User Equipment (UE) for selecting an access network for routing data of the UE in a wireless communication network is provided. The UE includes a communication interface, one or more processors, and a memory. The one or more processors are configured to receive a trigger indicating a requirement of one or more network services. Furthermore, the one or more processors are configured to determine that the UE is registered on a Third Generation Partnership Project (3GPP) access network and a non-3GPP access network simultaneously. Furthermore, the one or more processors are configured to identify an availability of the one or more network services in the 3GPP access network and the non-3GPP access network. Thereafter, the one or more processors are configured to perform one of, (i) selecting one of, the 3GPP access network and the non-3GPP network for routing data of the UE, based on the availability of the one or more network services in one of, the 3GPP access network and the non-3GPP access network, and (ii) selecting one of, the 3GPP access network and the non-3GPP network for routing data of the UE based on one or more network parameters, when the one or more network services are available in the 3GPP access network and the non-3GPP access network.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE ACCOMPANYING DRAWINGS

The above and other aspects, features, and advantages of certain embodiments of the disclosure will be more apparent from the following description taken in conjunction with the accompanying drawings, in which:

FIGS. 1A, 1B, 1C, 1D, 1E, 1F, and 1G illustrate various scenarios of selecting access network for routing data of a user equipment (UE) in conventional systems according to various embodiments of the disclosure;

FIG. 3 shows a flow chart illustrating method operations for selecting an access network for routing data of a UE in a wireless communication network, according to an embodiment of the disclosure;

Figure 5:
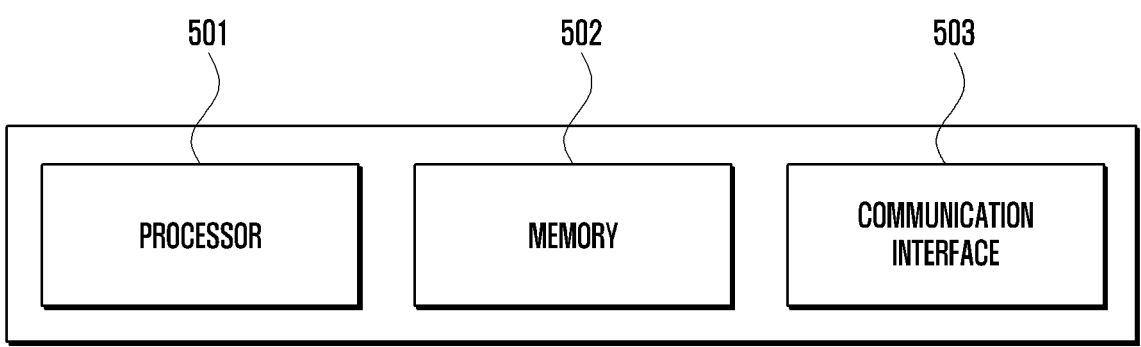
Figure 6:
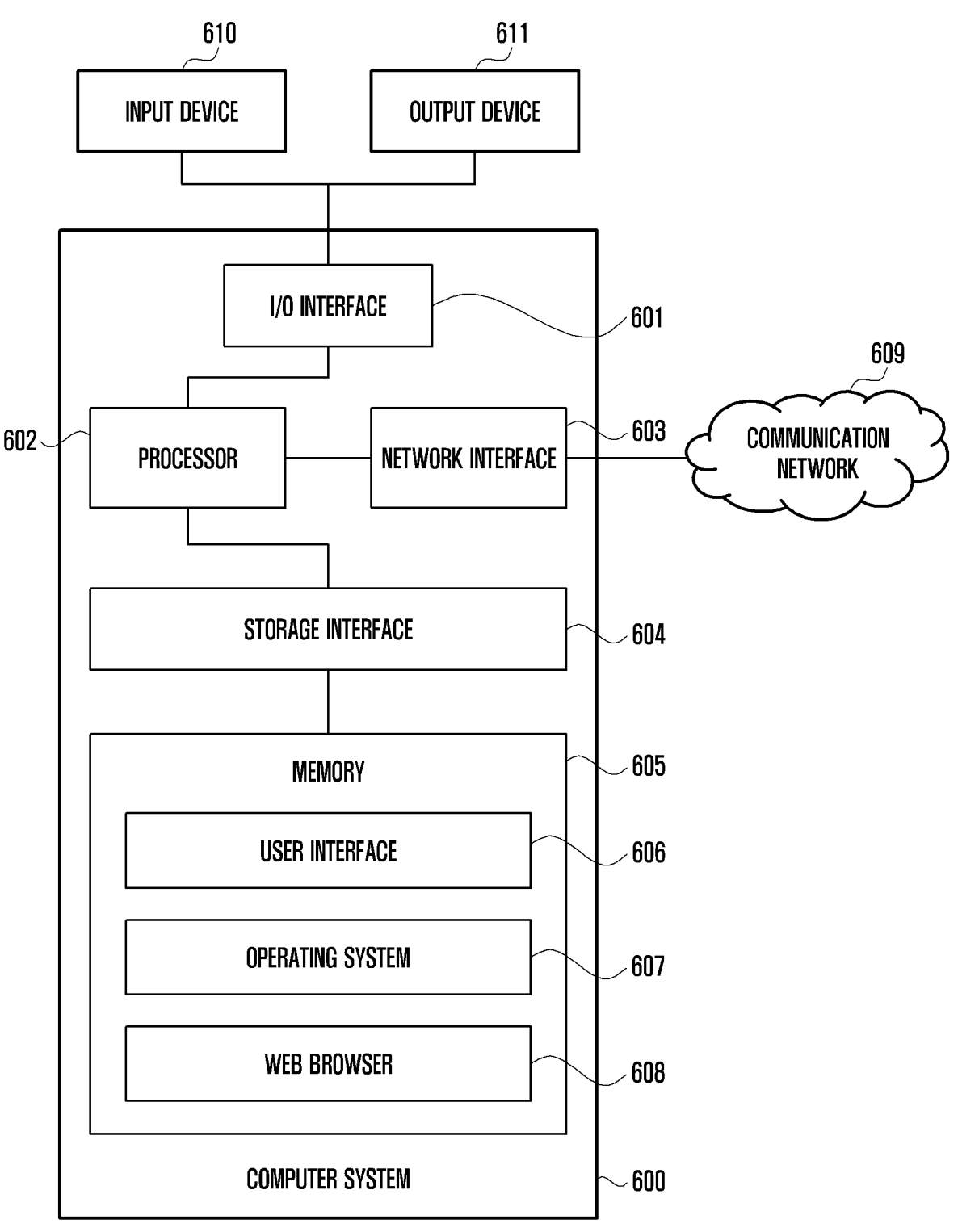

FIGS. 4A, 4B, 4C, and 4D show illustrations for selecting an access network for routing data of a UE in a wireless communication network, according to various embodiments of the disclosure;

FIG. 5 illustrates an overview architecture of a UE for selecting the access network for routing data of the UE in a wireless communication network, according to an embodiment of the disclosure; and FIG. 6 illustrates a block diagram of a computer system for implementing according to an embodiment of the disclosure.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the document, the word "exemplary" is used herein to mean "serving as an example, instance, or illustration." Any embodiment or implementation of the subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternatives falling within the scope of the disclosure.

The terms "comprises," "comprising," or any other variations thereof, are intended to cover a non-exclusive inclusion, such that a setup, device or method that comprises a list of components or operations does not include only those components or operations but may include other components or operations not expressly listed or inherent to such setup or device or method. In other words, one or more elements in a system or apparatus proceeded by "comprises . . . a" does not, without more constraints, preclude the existence of other elements or additional elements in the system or apparatus.

In the wireless communication networks, User Equipments (UEs) connect to a core network using the access networks. Examples of the access networks include Wi-Fi, Global System for Mobile communication (GSM), UMTS Terrestrial Radio Access Network (UTRAN), Worldwide Interoperability for Microwave Access (WiMAX), and the like. There are two types of access networks: 3GPPP access networks and non-3GPPP access networks.

With the advancement of technologies in the wireless communication networks, new technologies such as Local Area Data Network, network slicing, Voice over New Radio (VoNR) support, and the like, are emerging. The disclosure provides a method and a UE for selecting the access network for routing data of the UE by determining availability of such technologies/network services in the access network. Hence, the disclosure defines the access network to be selected when the UE is registered on the 3GPP access network and the non-3GPP access network simultaneously. Further, selection of the access network based on the availability of the network services enhances user experience.

FIGS. 1A, 1B, 1C, 1D, 1E, 1F, and 1G illustrate various scenarios of selecting access network for routing data of a UE in conventional systems according to various embodiments of the disclosure.

Figure 1A:
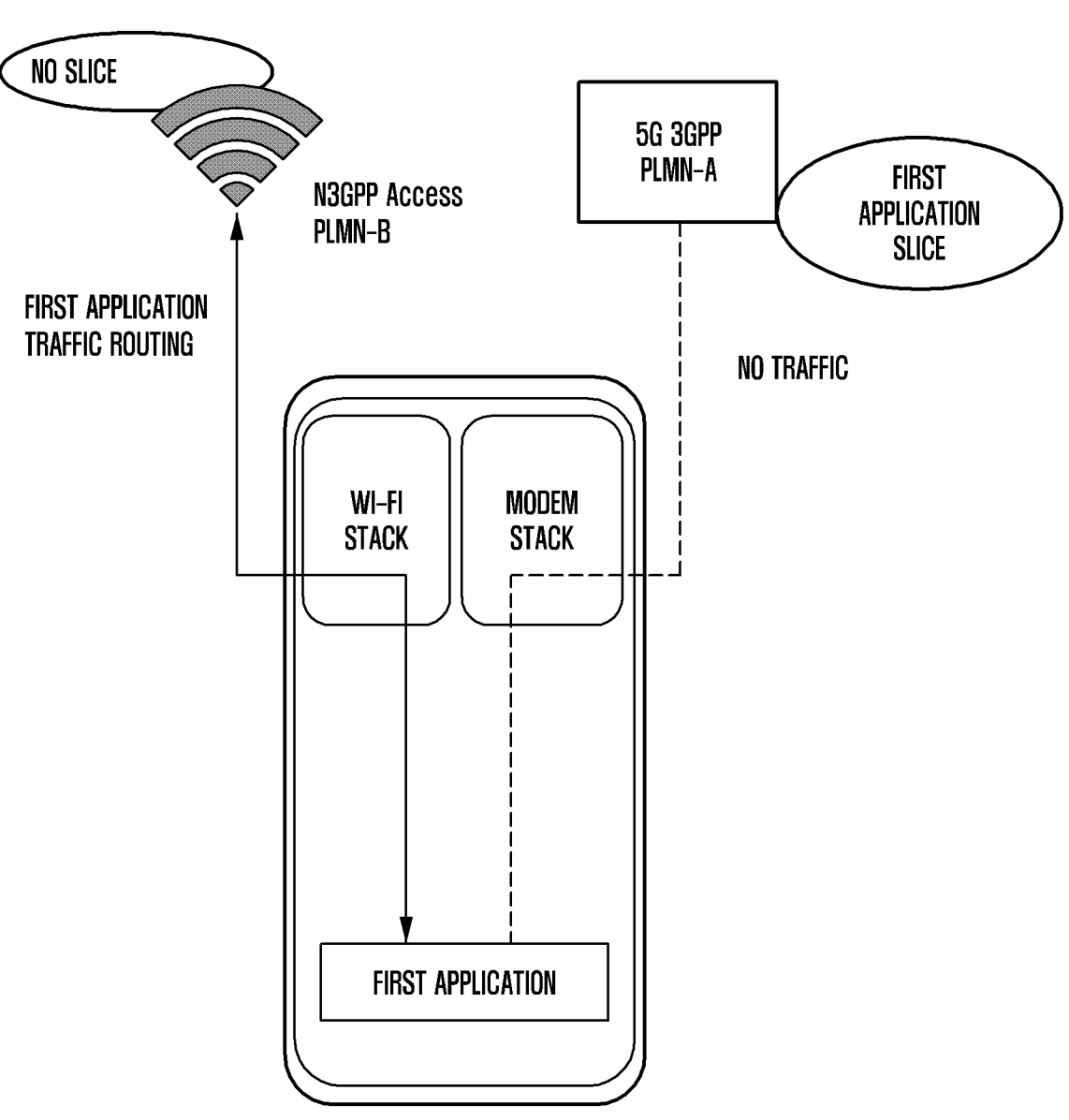

FIG. 1A illustrates a scenario where a user associated with the UE is using a first application. For example, the first application may be an entertainment application. The UE is registered on the 3GPP access network and the non-3GPP access network simultaneously. Application data associated with the first application has to be routed over a network. Different applications may have different requirements and may use different network slices. Network slicing is a method of creating multiple unique logical and virtualized networks over a common multi-domain infrastructure. Generally, network operators create network slices that can support a specific application, service, set of users, or network. Network slicing supports new services with vastly different requirements such as, throughput, latency, reliability, and the like.

Referring to FIG. 1A, the UE may be subscribed to a first application slice. In the conventional systems, the application data may be routed to the non-3GPP access network. However, the non-3GPP access network may not include availability of the first application slice, while the first application slice may be available in the 3GPP access network. Hence, routing the data of the UE to the non-3GPP access network in spite of slice availability in the 3GPP access network degrades user experience.

Figure 1B:
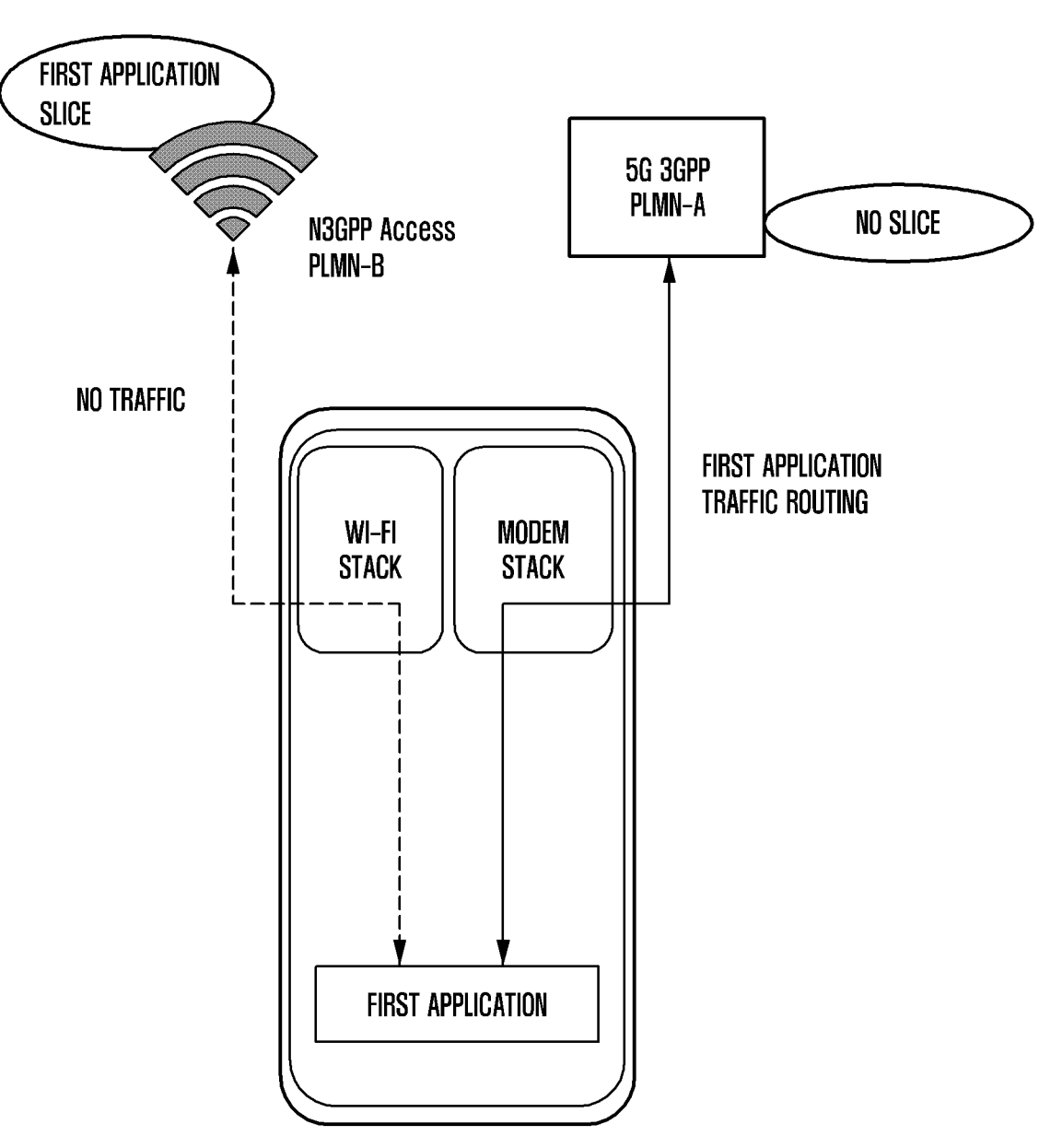

FIG. 1B illustrates a scenario where the user associated with the UE is using a first application. In the conventional systems, the application data may be routed to the 3GPP access network based on preferences of the network operator. However, the 3GPP access network may not include availability of the first application slice, while the first application slice may be available in the non-3GPP access network. Hence, routing the data of the UE to the 3GPP access network in spite of slice availability in the non-3GPP access network degrades user experience.

Figure 1C:
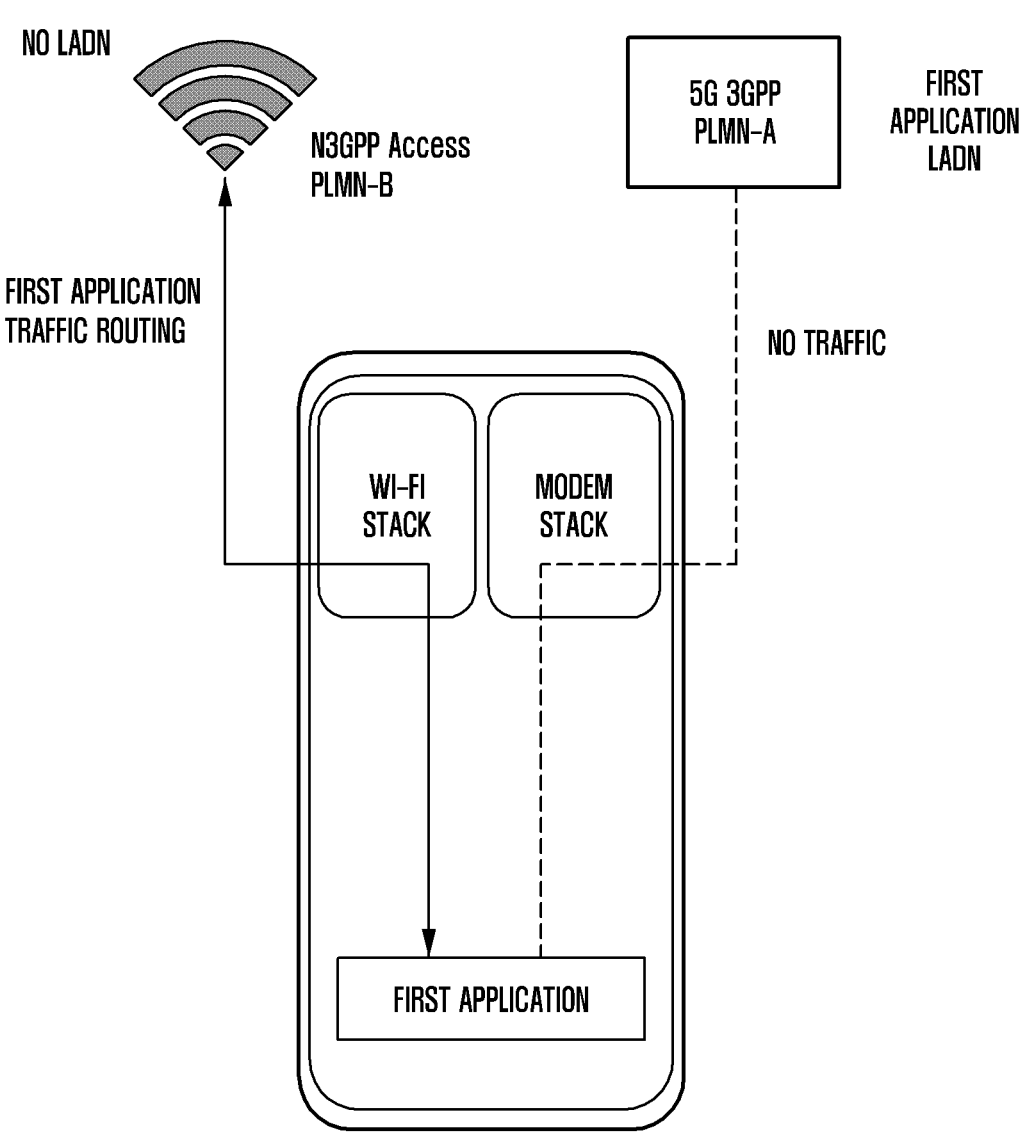

Similarly, FIG. 1C illustrates a scenario where the user associated with the UE is using a first application. The UE may be subscribed to a Local Area Data Network (LADN) service. In the conventional systems, the application data may be routed to the non-3GPP access network. However, the non-3GPP access network may not include availability of the LADN service, while the 3GPP access network may include the availability of the LADN service. Hence, routing the data of the UE to the non-3GPP access network in spite of service availability in the 3GPP access network degrades user experience.

Figure 1D:
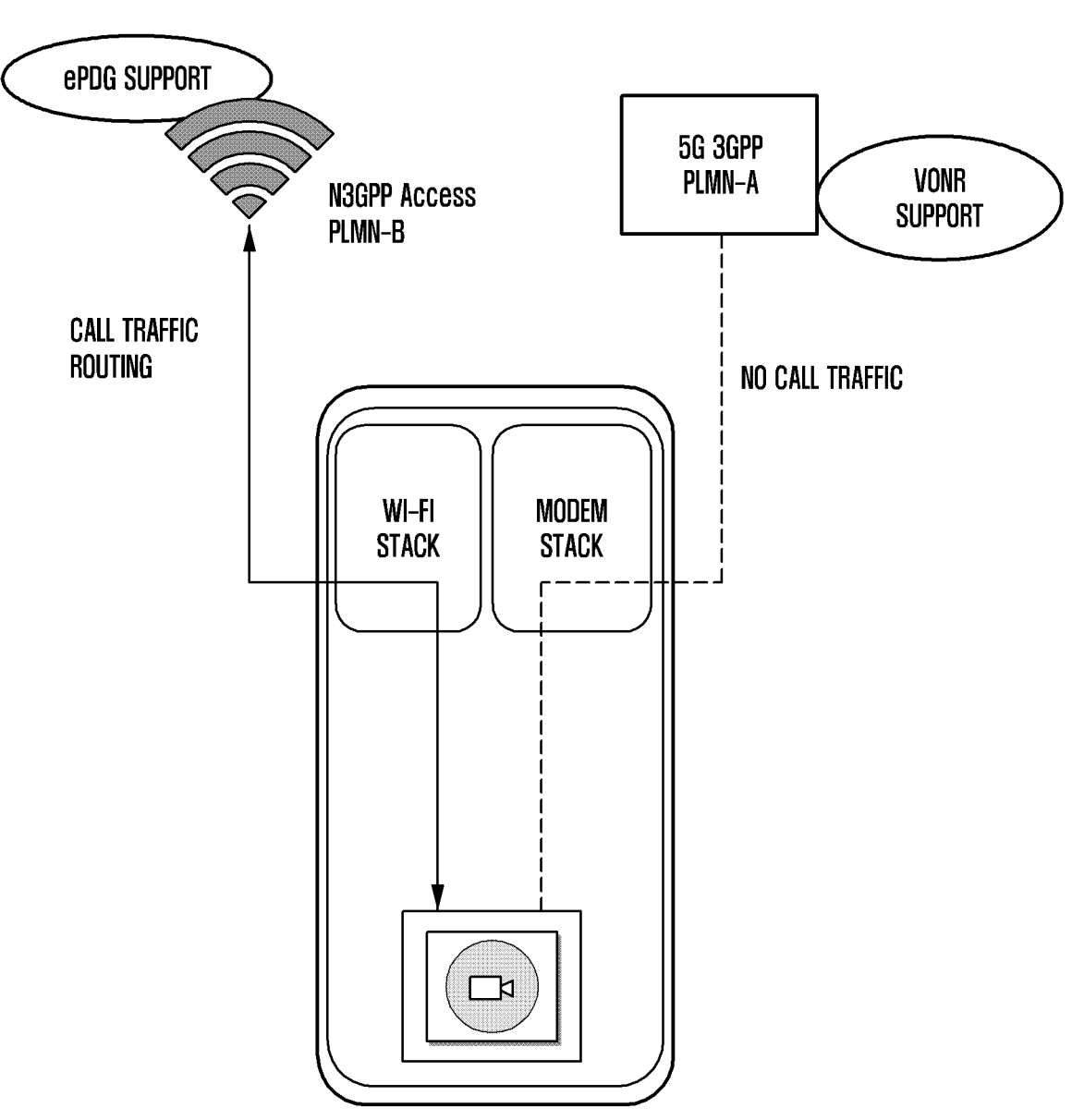

FIG. 1D illustrates a scenario where the user associated with the UE initiates a video call. The UE may include VoNR support. The non-3GPP access network may include evolved Packet Data Gateway (ePDG) support. In the conventional systems, the application data may be routed to the non-3GPP access network. However, the non-3GPP access network may not include the VoNR support. While the 3GPP access network may include the VoNR support. Hence, routing the data of the UE to the non-3GPP access network in spite of service availability in the 3GPP access network degrades user experience.

Figure 1E:
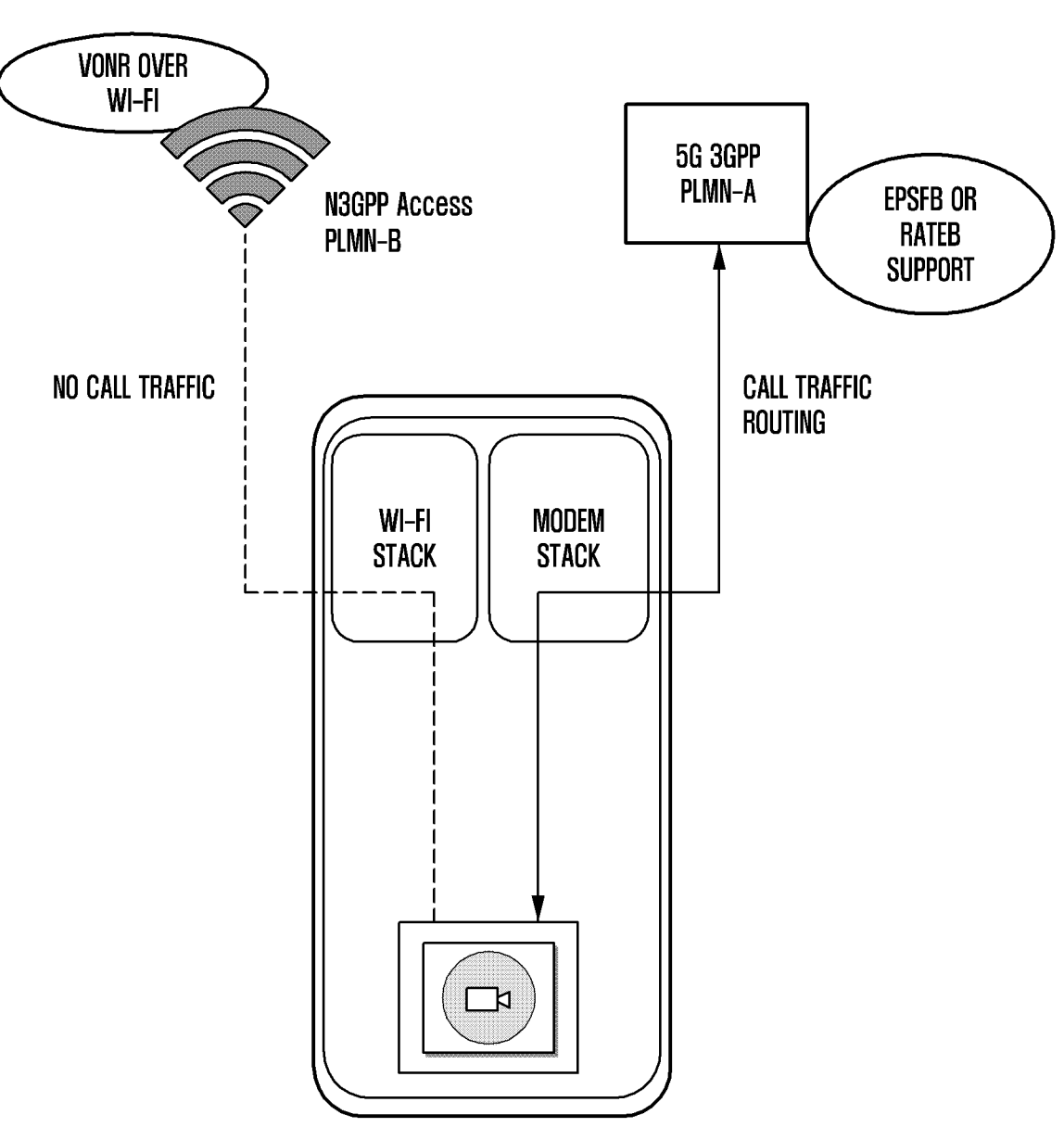

Similarly, FIG. 1E illustrates a scenario where the user associated with the UE initiates a video call. The non-3GPP access network may include the VoNR support. While the 3GPP access network may include Evolved Packet System Fallback (EPSFB)/Radio Access Technology Fallback (RATFB) support. In the conventional systems, the application data may be routed to the 3GPP access network. However, the non-3GPP access network includes the VoNR support. Hence, routing the data of the UE to the 3GPP access network in spite of service availability in the non-3GPP access network degrades user experience.

Figure 1F:
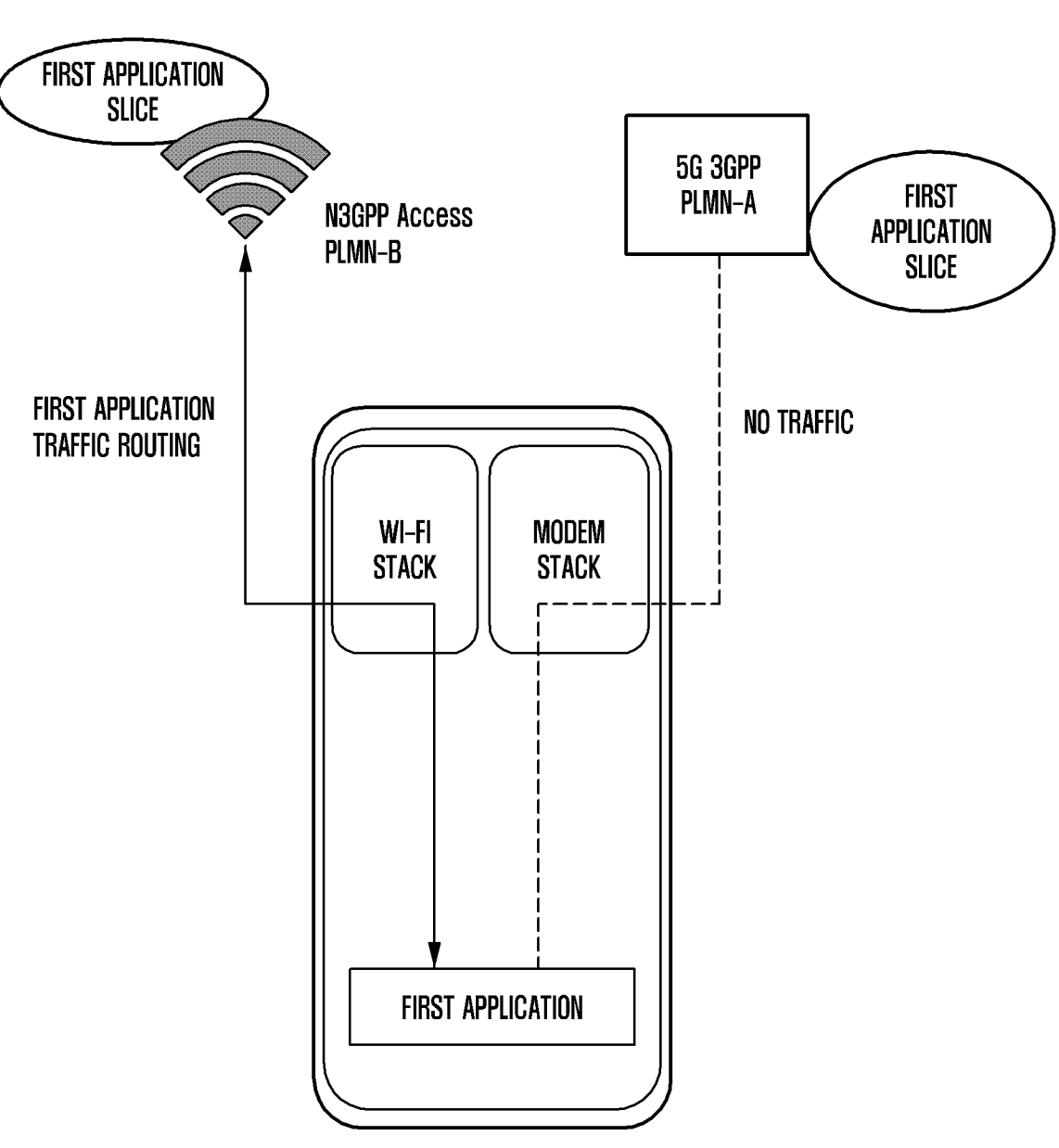

FIG. 1F illustrates a scenario where the user associated with the UE is using a first application. The first application slices may be available at 3GPP access network and the non-3GPP access network. However, network parameters of the first application slices may be different. For example, the first application slice in the non-3GPP access network may include a latency of 10 ms, whereas the first application slice in the 3GPP access network may include a latency of 5 ms. In the conventional systems, the application data may be routed to the 3GPP access network or the non-3GPP access network without considering the network parameters.

Figure 1G:
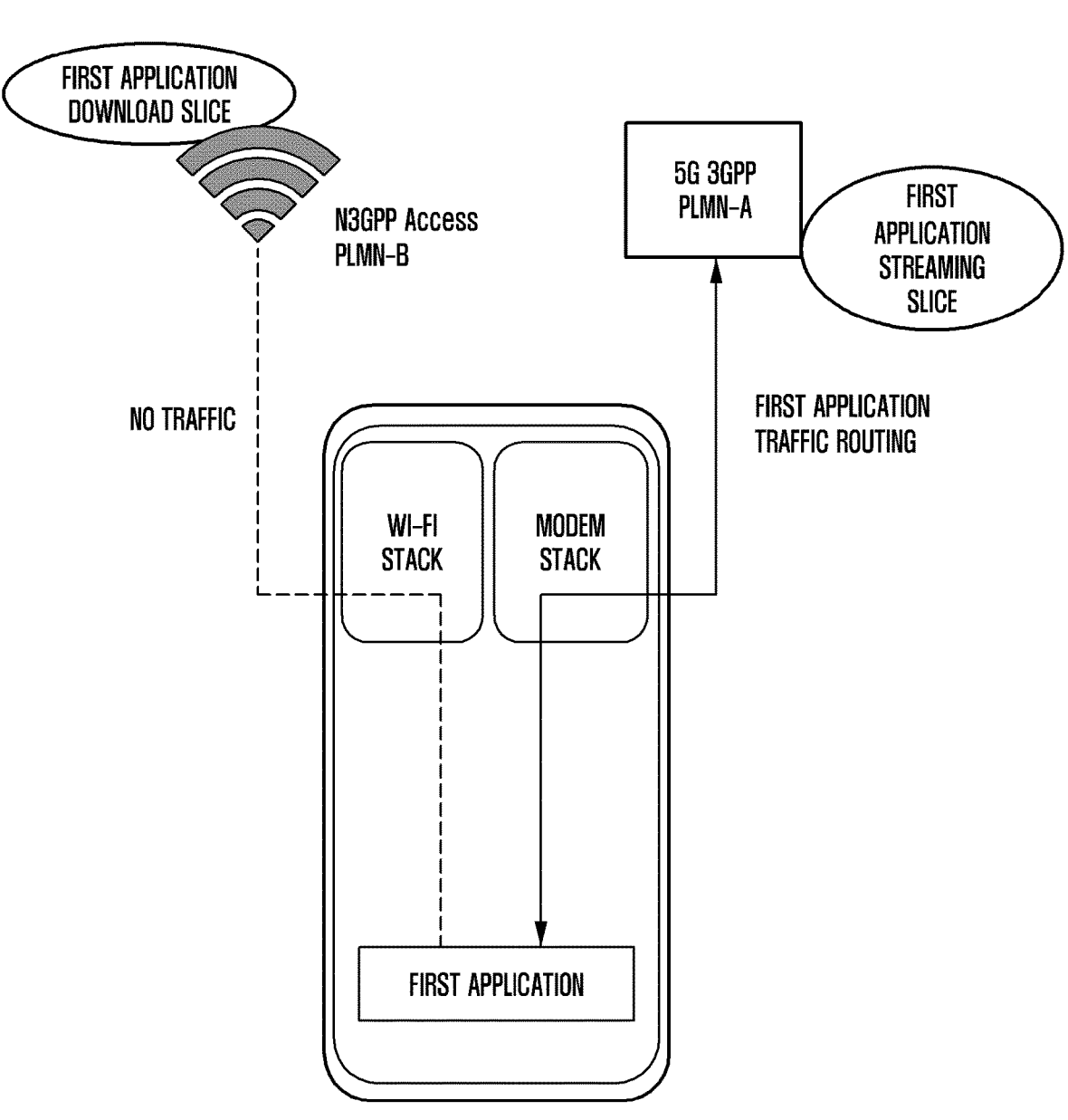

FIG. 1G illustrates a scenario where the user associated with the UE is using a first application. The UE may be subscribed to first application slices which requires multiple slices for providing multiple services (e.g., streaming slice for streaming service and browsing slice for browsing services). The 3GPP access network may include the availability of the streaming slice. While the non-3GPP access network may include the availability of the browsing slice. The UE may not be able to use all possible slices for different services of the first application when one access network is selected, even though both slices are available independently on different access networks.

Figure 2:
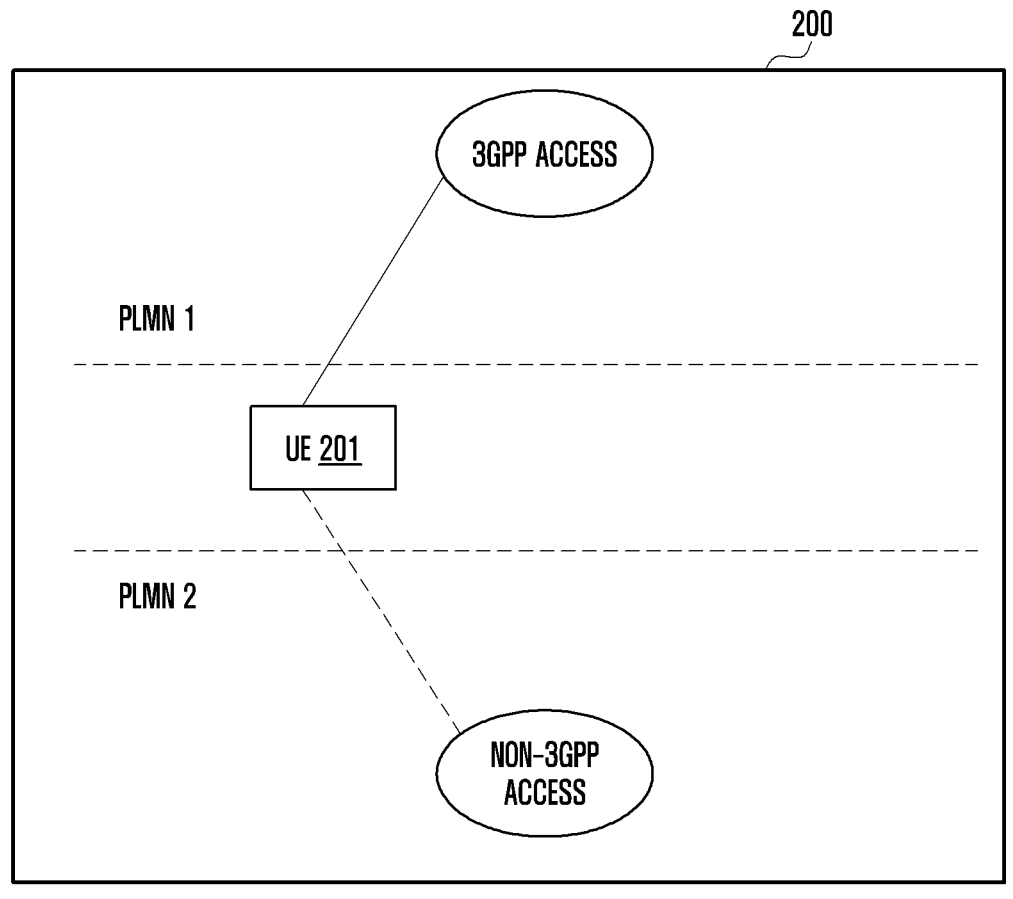
FIG. 2 illustrates an environment for selecting an access network for routing data of a UE in a wireless communication network, according to an embodiment of the disclosure.

FIG. 2 illustrates an environment for selecting an access network for routing data of a UE in a wireless communication network according to an embodiment of the disclosure.

The environment 200 comprises a UE 201 registered on a cell. The UE 201 may be any computing device such as, a laptop computer, a desktop computer, a Personal Computer (PC), a notebook, a smartphone, a tablet, e-book readers, a server, a network server, a cloud-based server, and the like. A user associated with the UE 201 may use services including, but not limited to, voice services, video services, data services, and the like. The data associated with the services such as voice traffic, video traffic, data traffic, and the like, has to be routed over a core network. The UE 201 has to select an access network for routing the data of the UE 201. The access network connects the UE 201 to the core network. The UE 201 may select one of, 3GPPP access network and non-3GPP access network. As illustrated, the UE 201 is registered on the 3GPP access network and the non-3GPP access network simultaneously. Public Land Mobile Network (PLMN) is a geographical area covered by a mobile network operator for voice and data services to a mobile subscriber. Referring to FIGS. 1A to 1G, the 3GPP access network belongs to PLMN-A and the non-3GPP access network belongs to PLMN-B. The disclosure provides a method and the UE 201 for selecting the access network for routing the data of the UE 201 in the wireless communication network.

In an embodiment of the disclosure, the UE 201 may receive a trigger indicating a requirement of one or more network services. For example, the user associated with the UE 201 may initiate a voice call with another user. The UE 201 may receive the trigger indicating the requirement of voice services. The UE 201 may determine that the UE 201 is registered on the 3GPP access network and the non-3GPP access network simultaneously (as illustrated in FIGS. 1A to 1G). The UE 201 may identify an availability of the one or more network services in the 3GPP access network and the non-3GPP access network. For example, the UE 201 may identify the availability of VoNR voice service in the 3GPP access network. Further, the UE 201 may perform one of: (i) selecting one of, the 3GPP access network and the non-3GPP network for routing data of the UE 201, based on the availability of the one or more network services in one of, the 3GPP access network and the non-3GPP access network; and (ii) selecting one of, the 3GPP access network and the non-3GPP network for routing data of the UE 201 based on one or more network parameters, when the one or more network services are available in the 3GPP access network and the non-3GPP access network. Referring to the above-stated example, the UE 201 may select the 3GPP access network as the VoNR voice service is available in the 3GPP access network.

FIG. 3 shows a flow chart illustrating method operations for selecting the access network for routing data of a UE in the wireless communication network, in accordance with some embodiments of the disclosure.

Referring to FIG. 3, the method 300 may comprise one or more operations. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At operation 301, the UE 201 receives a trigger indicating a requirement of one or more network services. The one or more network services may comprise at least one of, voice services, video services, network slicing services for user applications, network slicing services for services of user applications, and Local Area Data Network (LADN) services. The UE 201 may receive the trigger when the user associated with the UE 201 initiates a network service. For example, the user may initiate a voice call to another user. The UE 201 may receive the trigger indicating the requirement of the VoNR voice service in case of a 5G UE or a voice over long term evolution (VoLTE) voice service in case of a fourth generation (4G) UE.

Figure 4A:
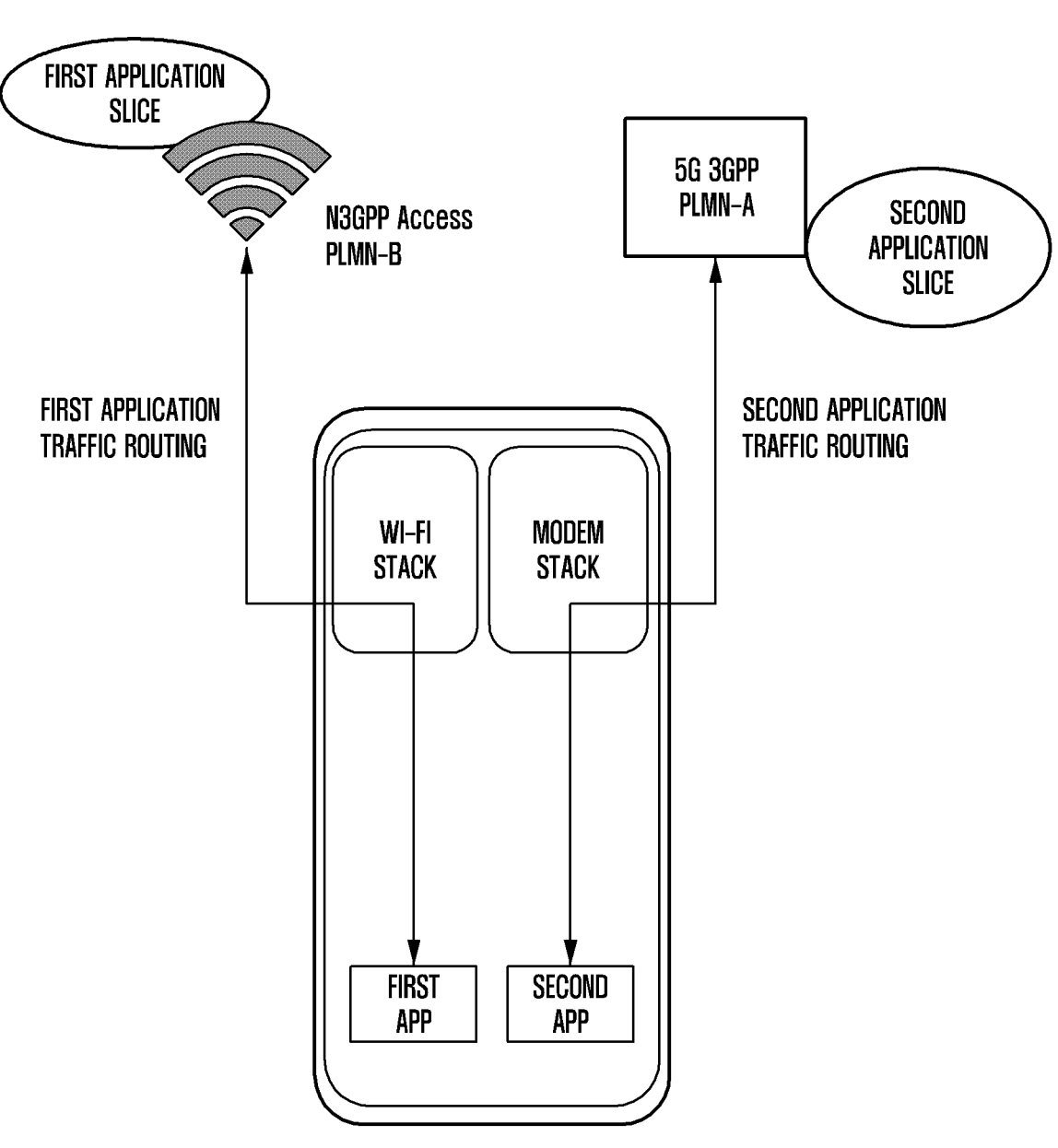

Referring to FIG. 4A, the user may start using entertainment applications (for example, a first application and a second application). The UE 201 may receive the trigger indicating the requirement of network slicing services.

Figure 4B:
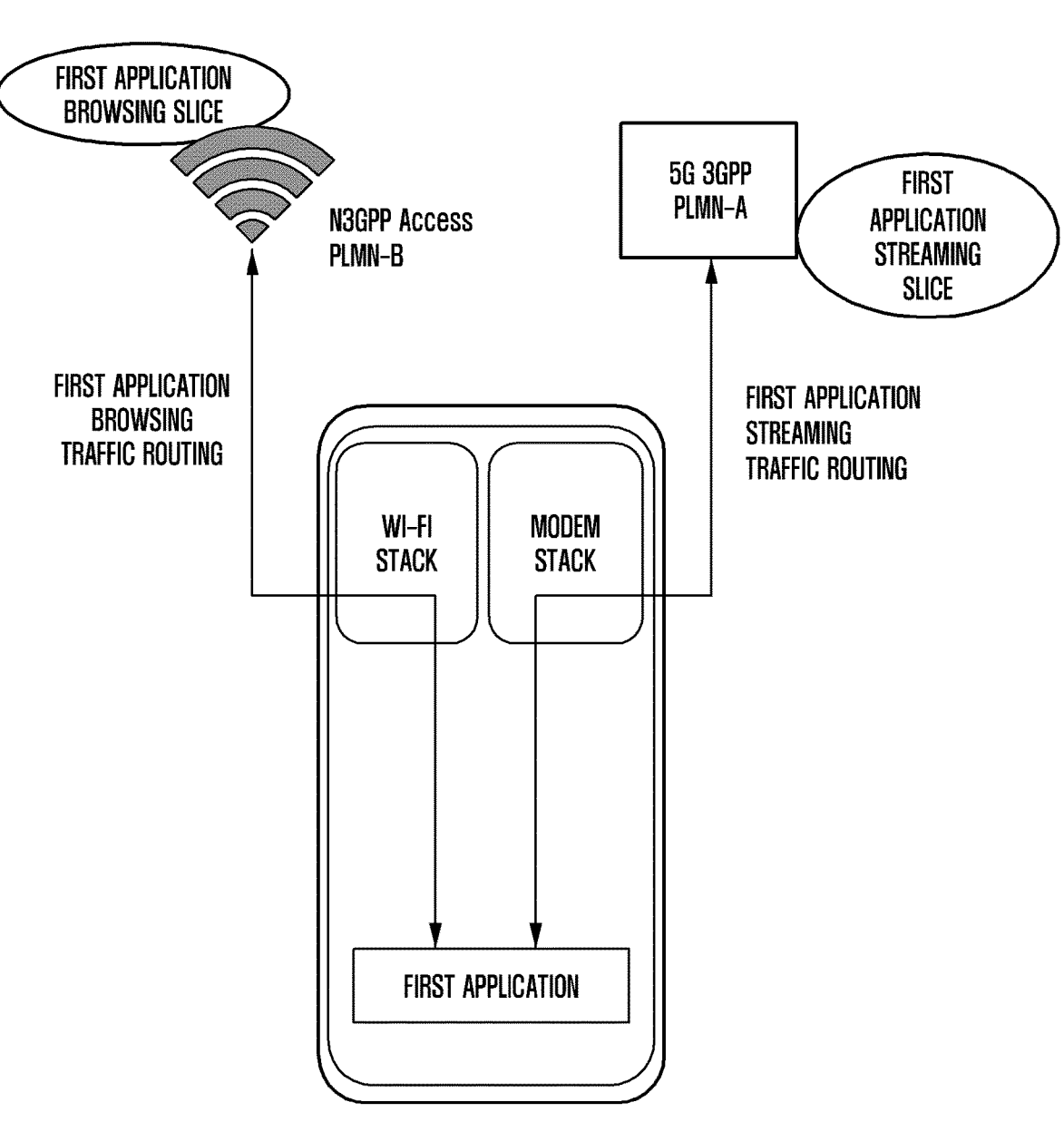

Referring to FIG. 4B, the user may start using the entertainment application for using different services of the entertainment application such as, streaming service and browsing service. The UE 201 may receive the trigger indicating the requirement of multiple network slices.

Figure 4C:
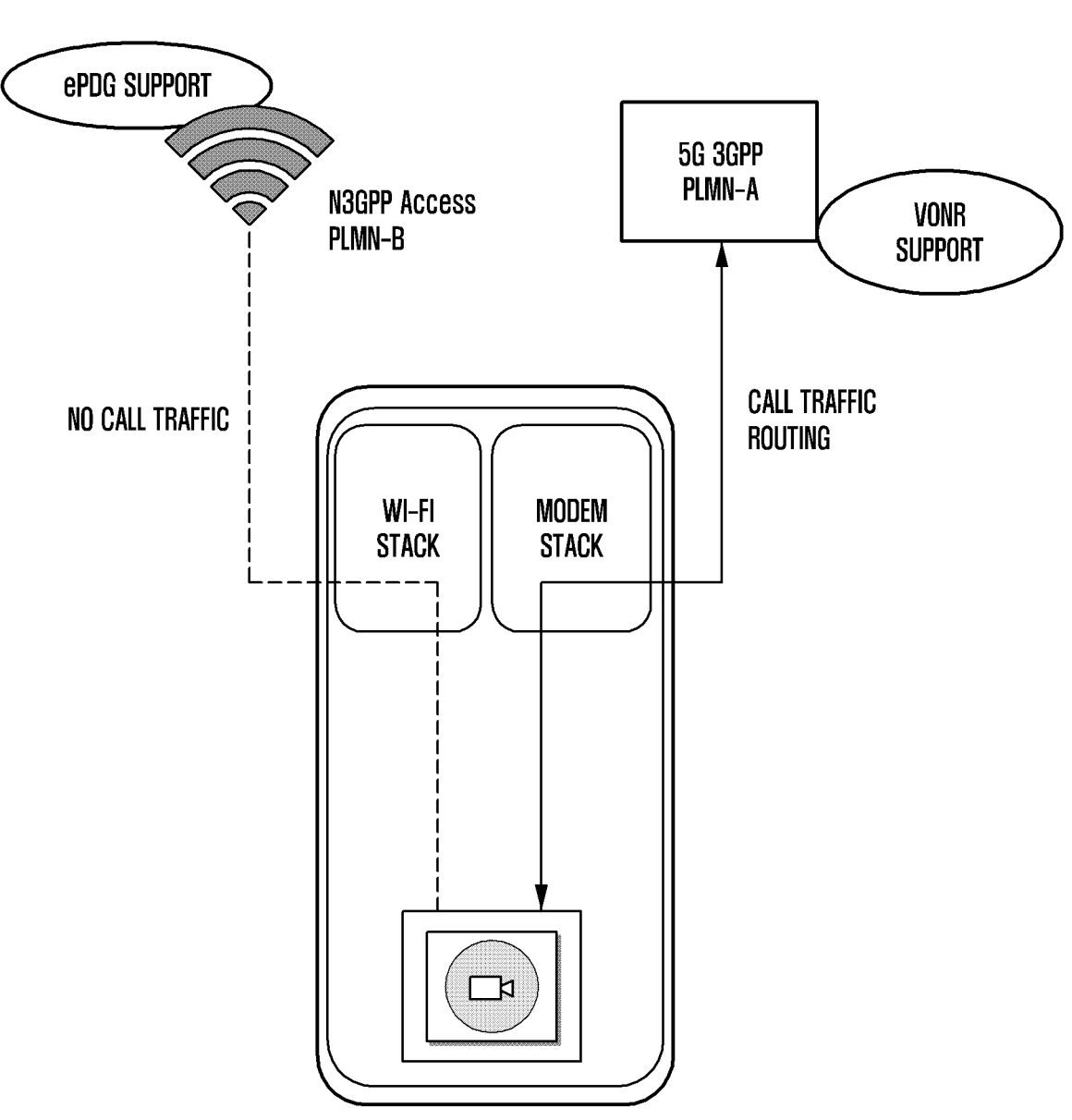
Figure 4D:
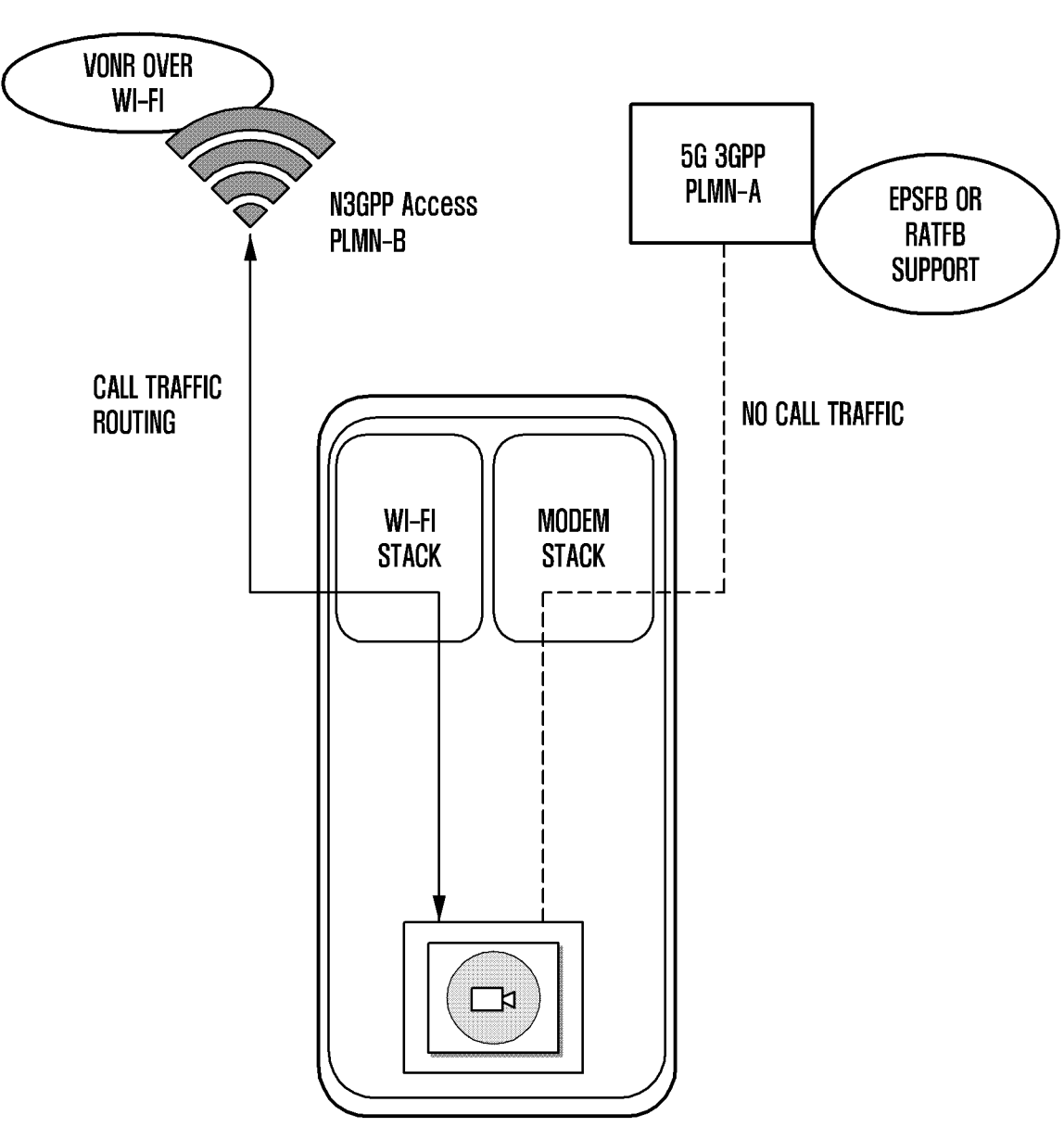

Referring to FIGS. 4C and 4D, the user may initiate a voice call to another user. The UE 201 may receive the trigger indicating the requirement of the VoNR voice service in case of a fifth generation (5G) UE. In another example, the UE 201 may receive the trigger indicating the requirement of VoLTE voice service in case of a 4G UE.

At operation 302, the UE 201 may determine that the UE 201 is registered on the 3GPP access network and the non-3GPP access network simultaneously. Particularly, the UE 201 may register on a cell. Further, the UE 201 may perform search procedures to connect to an access network. After the search procedure, the UE 201 may register on the 3GPP access network and the non-3GPP access network simultaneously. The 3GPP access network and the non-3GPP access network may be associated with different Public Land Mobile Networks (PLMNs). For example, the 3GPP access network may be associated with a first PLMN (say PLMN-A). The non-3GPP access network may be associated with a second PLMN (say PLMN-B).

At operation 303, the UE 201 may identify an availability of the one or more network services in the 3GPP access network and the non-3GPP access network. Firstly, the UE 201 evaluates UE Route Selection Policy (URSP) rules of the first PLMN associated with the 3GPP access network and the second PLMN associated with the non-3GPP access network. The URSP Rules may be used to determine whether data detected from an application in the UE 201 can be associated to an established Protocol Data Unit (PDU) session or if there is a need to trigger the establishment of a new PDU session. Each URSP rule contains a Traffic descriptor containing one or more components. The traffic descriptor determines when each URSP rule is applicable. Typically, a URSP rule is determined to be applicable when every component in the traffic descriptor matches corresponding information from the application in the UE 201. In an embodiment, each URSP rule contains a list of route selection descriptors containing one or multiple route selection descriptors each having a different route selection descriptor precedence value. Table 1 illustrates the URSP rules. As seen from the Table 1, the URSP rules are associated with the traffic descriptors containing the one or more components. Table 2 illustrates the route selection descriptors. For example, access type preference indicates preferred Access Type (3GPP or non-3GPP or Multi-Access) when the UE 201 establishes the PDU Session for the application. The 3GPP or non-3GGP access for offloading the data of the application may be determined from the access type preference.

TABLE 1

| URSP Rule Structure | | |
|---|---|---|
| Information | Information Content | Description |
| Rule Precedence | Precedence value or number | Determines the order URSP rule is enforced in the UE |
| Traffic Descriptors | Application Descriptors | Operating system (OS) ID (OSID) and application ID (OSAppId(s)) |
| | IP Descriptors | Destination internet protocol (IP) 3 tuple(s) (IP Address or IP version 6 (Ipv6) Network prefix, port number, protocol ID) |
| | Domain Descriptors | Destination fully qualified domain names (FQDNs) |
| | Non IP Descriptors | Destination of non IP traffics |
| | data network name (DNN) | This is matched against the DNN information provided by Application |
| | Connection Capabilities | This is matched against information provide by Application when it requests a network connection with certain capabilities |
| List of Route Selection Descriptors | List | List of Route Selection descriptors |

TABLE 2

| Information name | Sub Information name | Description |
|---|---|---|
| Route Selection Descriptor Precedence | Precedence value or number | Determines the order in which the Route Selection Descriptors are to be applied. |
| Route selection components | Session and service continuity (SSC) Mode Selection | One single value of SSC mode. |
| | Network Slice Selection (NSS) | Either a single value or a list of values of single NSS assistance information (S-NSSAI(s)). |
| | DNN Selection | Either a single value or a list of values of DNN(s). |
| | PDU Session Type Selection | One single value of PDU Session Type |
| | Non-Seamless Offload indication | Indicates if the traffic of the matching application is to be offloaded to non-3GPP access outside of a PDU Session. |
| | Access Type preference | Indicates the preferred Access Type (3GPP or non-3GPP or Multi-Access) |

TABLE 2-continued

| Information name | Sub Information name | Description |
|---|---|---|
| Route Selection Validation Criteria | Time Window | when the UE establishes a PDU Session for the matching application. The time window when the matching traffic is allowed. The route selection descriptor (RSD) is not considered to be valid if the current time is not in the time window. |
| | Location Criteria | The UE location where the matching traffic is allowed. The RSD rule is not considered to be valid if the UE location does not match the location criteria. |

The UE 201 determines the availability of the one or more network services in the 3GPP access network and the non-3GPP access network by evaluating the URSP rules of the first PLMN and the second PLMN. For example, the UE 201 evaluates the URSP rules of the first PLMN and determines the availability of a first application slice. The UE 201 evaluates the URSP rules of the second PLMN and determines non-availability of the first application slice. The UE 201 determines the availability of the first application slice in the 3GPP access network.

At operation 304, the UE 201 may perform one of the following: (i) select one of, the 3GPP access network and the non-3GPP network for routing data of the UE 201, based on the availability of the one or more network services in one of, the 3GPP access network and the non-3GPP access network; and (ii) select one of, the 3GPP access network and the non-3GPP network for routing data of the UE 201 based on one or more network parameters, when the one or more network services are available in the 3GPP access network and the non-3GPP access network. Referring to operation (i), the UE 201 may select either the 3GPP access network or the non-3GPP access network based on the availability of the network services in the 3GPP access network or the non-3GPP access network. Referring to the above-stated example, the UE 201 selects the 3GPP access network since the first application slice is available in the 3GPP access network. Referring to operation (ii), the UE 201 selects either the 3GPP access network or the non-3GPP access network based on the one or more network parameters, when the one or more network services are available in both the 3GPP access network and the non-3GPP access network. The one or more network parameters comprises at least one of, but not limited to, Round-Trip Time (RTT) delay and available bandwidth in the 3GPP access network and the non-3GPP access network. Firstly, the UE 201 measures the one or more network parameters of the 3GPP access network and the non-3GPP access network. Next, the UE 201 may compare the one or more network parameters of the 3GPP access network with the one or more network parameters of the non-3GPP access network. Then, the UE 201 selects one of, the 3GPP access network and the non-3GPP network, based on the comparison. For example, the first application slice may be available in both the 3GPP access network and the non-3GPP access network. The 3GPP access network may include a latency of 5 ms and the non-3GPP access network may include a latency of 10 ms. In such case, the UE 201 may select the 3GPP access network. In another example, the 3GPP access network may include a bandwidth of 50 MHz. While the non-3GPP access network may include a bandwidth of 100 MHz. In such case, the UE 201 may select the non-3GPP access network. In another example, the RTT delay may be 50 ms in the 3GPP access network and 70 ms in the non-3GPP access network. In such case, the UE 201 may select the 3GPP access network. In an embodiment, the UE 201 is further configured to select one of, the 3GPP access network and the non-3GPP network for routing data of the UE 201 based on the one or more network parameters, when the one or more network services are not available in the 3GPP access network and the non-3GPP access network. For example, both the 3GPP access network and the non-3GPP access network may not include the VoNR support for routing voice traffic of the UE 201. For instance, a latency in the 3GPP access network may be 5 ms. The latency in the non-3GPP access network may be 10 ms. In such case, the UE 201 may select the 3GPP access network.

Reference is made to FIGS. 4A to 4D illustrating selecting an access network for routing data of the UE 201 in the wireless communication network. FIG. 4A illustrates a scenario where a user associated with the UE 201 is using first application and a second application. The UE 201 identifies the availability of first application slice in the non-3GPP access network and the second application slice in the 3GPP access network. Therefore, the UE 201 selects the non-3GPP access network to route first application traffic i.e., application data of the first application. The UE 201 selects the 3GPP access network to route second application traffic i.e., application data of the second application. FIG. 4B illustrates a scenario where a user associated with the UE 201 is using different services of the first application. The UE 201 identifies the availability of first application browsing slice in the non-3GPP access network and first application streaming slice in the 3GPP access network. Therefore, the UE 201 selects the non-3GPP access network to route first application browsing traffic. The UE 201 selects the 3GPP access network to route first application streaming traffic. Hence, the UE 201 can use both the services of same application by using two different access networks simultaneously and route application traffic to two different access networks. FIG. 4C illustrates a scenario where a user associated with the UE 201 initiates a voice or video call. The UE 201 identifies the availability of VoNR service in the 3GPP access network. Therefore, the UE 201 selects the 3GPP access network to route call traffic. The call traffic is routed to the 3GPP access network yielding better call quality, UHD video and voice calling support. Similarly FIG. 4D illustrates availability of VoNR service in the non-3GPP access network, Therefore, the UE 201 selects the non-3GPP access network to route call traffic. Thus, better user experience is provided. In an example, LADN service may be available in the 3GPP access network. In such case, the UE 201 selects the 3GPP access network to route data of the UE 201.

FIG. 5 illustrates overview architecture of a UE for selecting the access network for routing data of the UE in the wireless communication network, according to an embodiment of the disclosure.

The UE 201 may comprise one or more processors 501, a memory 502, and a communication interface 503. In some embodiments, the memory 502 may be communicatively coupled to the one or more processors 501. The memory 502 stores instructions executable by the one or more processors 501. The one or more processors 501 may comprise at least one data processor for executing program components for executing user or system-generated requests. The memory 502 may be communicatively coupled to the one or more processors 501. The memory 502 stores instructions, executable by the one or more processors 501, which, on execution, may cause the one or more processors 501 to select the access network for routing data of the UE 201 in the wireless communication network. The communication interface 503 is configured to transmit and receive messages/signals/control signaling. Further, the UE 201 may comprise submodules such as a trigger module, an access network determination module, an availability identification module, an access network selection module, and other hardware modules. The trigger module may be configured to receive the trigger indicating the requirement of the one or more network services. The access network determination module may be configured to determine that the UE 201 is registered on the 3GPP access network and the non-3GPP access network simultaneously. The availability identification module is configured to identifying the availability of the one or more network services in the 3GPP access network and the non-3GPP access network. The access network selection module may be configured to perform one of: (i) select one of, the 3GPP access network and the non-3GPP network for routing data of the UE 201, based on the availability of the one or more network services in one of, the 3GPP access network and the non-3GPP access network, and select one of, the 3GPP access network and the non-3GPP network for routing data of the UE 201 based on one or more network parameters, when the one or more network services are available in the 3GPP access network and the non-3GPP access network.

Computer System

FIG. 6 illustrates a block diagram of a computer system for implementing according to an embodiment of the disclosure.

In an embodiment, the computer system 600 may be the UE 201. Thus, the computer system 600 may be used to select the access network for routing data of the UE 201 in the wireless communication network. The computer system 600 may comprise a Central Processing Unit (CPU) 602 (also referred to as a "processor"). The processor 602 may comprise at least one data processor. The processor 602 may include specialized processing units such as integrated system (bus) controllers, memory management control units, floating point units, graphics processing units, digital signal processing units, etc.

The processor 602 may be disposed in communication with one or more input/output (I/O) devices (not shown) via I/O interface 601. The I/O interface 601 may employ communication protocols/methods such as, without limitation, audio, analog, digital, monoaural, RCA, stereo, Institute of Electrical and Electronics Engineers (IEEE)-1394, serial bus, universal serial bus (USB), infrared, PS/2, bayonet Neill-Concelman (BNC), coaxial, component, composite, digital visual interface (DVI), high-definition multimedia interface (HDMI), Radio Frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices. For example, the input device 610 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 611 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The computer system 600 may communicate with the one or more receivers 612 through the communication network 609. The processor 602 may be disposed in communication with the communication network 609 via a network interface 603. The network interface 603 may communicate with the communication network 609. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 609 may include, without limitation, a direct interconnection, local area network (LAN), wide area network (WAN), wireless network (e.g., using Wireless Application Protocol), the Internet, etc. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 609 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., random access memory (RAM), read only memory (ROM), etc. not shown in FIG. 6) via a storage interface 604. The storage interface 604 may connect to memory 605 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607, web browser 608 etc. In some embodiments, computer system 600 may store user/application data, such as, the data, variables, records, etc., as described in this disclosure. Such databases may be implemented as fault-tolerant, relational, scalable, secure databases such as Oracle® or Sybase®.

The operating system 607 may facilitate resource management and operation of the computer system 600. Examples of operating systems include, without limitation, APPLE MACINTOSH® OS X, UNIX®, UNIX-like system distributions (E.G., BERKELEY SOFTWARE DISTRIBUTION™ (BSD), FREEBSD™ NETBSD™, OPENBSD™, etc.), LINUX DISTRIBUTIONS™ (E.G., RED HAT™ UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACK-BERRY® OS, or the like.

In some embodiments, the computer system 600 may implement the web browser 608 stored program component. The web browser 608 may be a hypertext viewing application, for example MICROSOFT® INTERNET EXPLORER™ GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX™, DHTML™, ADOBE® FLASH™, JAVASCRIPT™, JAVA™, Application Programming Interfaces (APIs), etc. In some embodiments, the computer system 600 may implement a mail server (not shown in figure) stored program component. The mail server may be an Internet mail server such as Microsoft Exchange, or the like. The mail server may utilize facilities such as ASP™, ACTIVEX™, ANSI™ C++/C #, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 600 may implement a mail client stored program component. The mail client (not shown in figure) may be a mail viewing application, such as APPLE® MAIL™, MICROSOFT® ENTOURAGE™, MICROSOFT® OUTLOOK™, MOZILLA® THUNDER-BIRD™, etc.

Furthermore, one or more computer-readable storage media may be utilized in implementing embodiments consistent with the disclosure. A computer-readable storage medium refers to any type of physical memory on which information or data readable by a processor may be stored. Thus, a computer-readable storage medium may store instructions for execution by one or more processors, including instructions for causing the processor(s) to perform operations or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, Compact Disc Read-Only Memory (CD ROMs), Digital Video Disc (DVDs), flash drives, disks, and any other physical storage media.

Embodiments of the disclosure defines the access network to be selected when the UE is registered on the 3GPP access network and the non-3GPP access network simultaneously. Further, selection of the access network based on the availability of the network services enhances user experience. Also, the disclosure provides methods to select the access network based on the one or more network parameters in the 3GPP access network and the non-3GPP access network. Thus, the user experience is further enhanced.

The terms "an embodiment," "embodiment," "embodiments," "the embodiment," "the embodiments," "one or more embodiments," "some embodiments," and "one embodiment" mean "one or more (but not all) embodiments of the disclosure(s)" unless expressly specified otherwise.

The terms "including," "comprising," "having" and variations thereof mean "including but not limited to," unless expressly specified otherwise.

The enumerated listing of items does not imply that any or all of the items are mutually exclusive, unless expressly specified otherwise. The terms "a," "an" and "the" mean "one or more," unless expressly specified otherwise.

A description of an embodiment with several components in communication with each other does not imply that all such components are required. On the contrary a variety of optional components are described to illustrate the wide variety of possible embodiments of the disclosure.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

The illustrated operations of FIG. 3 show certain events occurring in a certain order. In alternative embodiments, certain operations may be performed in a different order, modified, or removed. Moreover, operations may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the disclosure is intended to be illustrative, but not limiting, of the scope of the invention, which is set forth in the following claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of selecting an access network for routing data of a User Equipment (UE) in a wireless communication network, the method comprising:

receiving, by a UE, a trigger indicating a requirement of one or more network services;

determining, by the UE, that the UE is registered on a Third Generation Partnership Project (3GPP) access network and a non-3GPP access network simultaneously;

identifying, by the UE, an availability of the one or more network services in the 3GPP access network and the non-3GPP access network, the identifying of the availability of the one or more network services including evaluating UE Route Selection Policy (URSP) rules of a first Public Land Mobile Network (PLMN) associated with the 3GPP access network and a second PLMN associated with the non-3GPP access network; and performing, by the UE, one of:

selecting one of, the 3GPP access network or the non-3GPP access network for routing data of the UE, based on the availability of the one or more network services in one of, the 3GPP access network or the non-3GPP access network, or selecting one of, the 3GPP access network or the non-3GPP access network for routing data of the UE based on one or more network parameters, in response to the one or more network services being available in the 3GPP access network and the non-3GPP access network.

2. The method of claim 1, wherein the one or more network services comprise at least one of, voice services, video services, network slicing services for user applications, network slicing services for services of user applications, or Local Area Data Network (LADN) services.

3. The method of claim 1, wherein identifying the availability of the one or more network services in the 3GPP access network and the non-3GPP access network comprises:

determining the availability of the one or more network services in the 3GPP access network and the non-3GPP access network based on the evaluation.

4. The method of claim 1, wherein the one or more network parameters comprises at least one of, Round-Trip Time (RTT) delay or available bandwidth, in the 3GPP access network and the non-3GPP access network.

5. The method of claim 1, wherein the selection based on the one or more network parameters comprises:

measuring the one or more network parameters of the 3GPP access network and the non-3GPP access network;

comparing the one or more network parameters of the 3GPP access network with the one or more network parameters of the non-3GPP access network; and selecting one of, the 3GPP access network or the non-3GPP access network, based on the comparison.

6. The method of claim 1, wherein the performing further comprises selecting one of, the 3GPP access network or the non-3GPP access network for routing data of the UE based on the one or more network parameters, in response to the one or more network services being unavailable in the 3GPP access network and the non-3GPP access network.

7. A User Equipment (UE) for selecting an access network for routing data of the UE in a wireless communication network, the UE comprising:

a communication interface;

one or more processors; and a memory storing processor-executable instructions, which, on execution, cause the one or more processors to:

receive a trigger indicating a requirement of one or more network services, determine that the UE is registered on a Third Generation Partnership Project (3GPP) access network and a non-3GPP access network simultaneously, identify an availability of the one or more network services in the 3GPP access network and the non-3GPP access network, the identifying of the availability of the one or more network services including evaluating UE Route Selection Policy (URSP) rules of a first Public Land Mobile Network (PLMN)

associated with the 3GPP access network and a second PLMN associated with the non-3GPP access network, and perform one of:

selecting one of, the 3GPP access network or the non-3GPP access network for routing data of the UE, based on the availability of the one or more network services, in one of, the 3GPP access network or the non-3GPP access network, or selecting one of, the 3GPP access network or the non-3GPP access network for routing data of the UE based on one or more network parameters, in response to the one or more network services being available in the 3GPP access network and the non-3GPP access network.

8. The UE of claim 7, wherein the one or more network services comprise at least one of, voice services, video services, network slicing services for user applications, network slicing services for services of user applications, or Local Area Data Network (LADN) services.

9. The UE of claim 7, wherein the one or more processors identify the availability of the one or more network services in the 3GPP access network and the non-3GPP access network by:

determining the availability of the one or more network services in the 3GPP access network and the non-3GPP access network based on the evaluation.

10. The UE of claim 7, wherein the one or more network parameters comprises at least one of, Round-Trip Time (RTT) delay or available bandwidth, in the 3GPP access network and the non-3GPP access network.

11. The UE of claim 7, wherein the one or more processors perform the selection based on the one or more network parameters by:

measuring the one or more network parameters of the 3GPP access network and the non-3GPP access network;

comparing the one or more network parameters of the 3GPP access network with the one or more network parameters of the non-3GPP access network; and selecting one of, the 3GPP access network or the non-3GPP access network, based on the comparison.

12. The UE of claim 7, wherein the one or more processors are further configured to select one of, the 3GPP access network or the non-3GPP access network for routing data of the UE based on the one or more network parameters, in response to the one or more network services being unavailable in the 3GPP access network and the non-3GPP access network.

13. The UE of claim 7, wherein the one or more network services comprise network slicing services for a plurality of services of a user application.

14. The UE of claim 13, wherein a first service of the plurality of services is routed on an application slice of the first PLMN associated with the 3GPP access network, and wherein a second service of the plurality of services is routed on an application slice of the second PLMN associated with the non-3GPP access network.

15. The UE of claim 14, wherein the first service of the plurality of services of the user application is routed on the application slice of the first PLMN associated with the 3GPP access network while the second service of the plurality of services of the user application is simultaneously routed on the application slice of the second PLMN associated with the non-3GPP access network.

* * * * *